March 26, 1940.                R. B. SMART                 2,195,229
                                TRANSMISSION
                             Filed Jan. 28, 1939
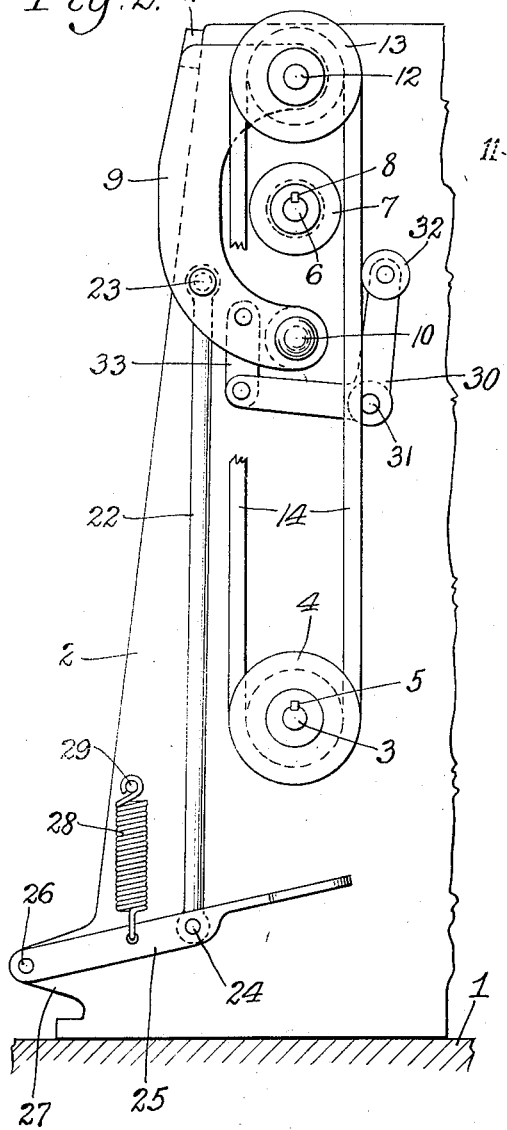
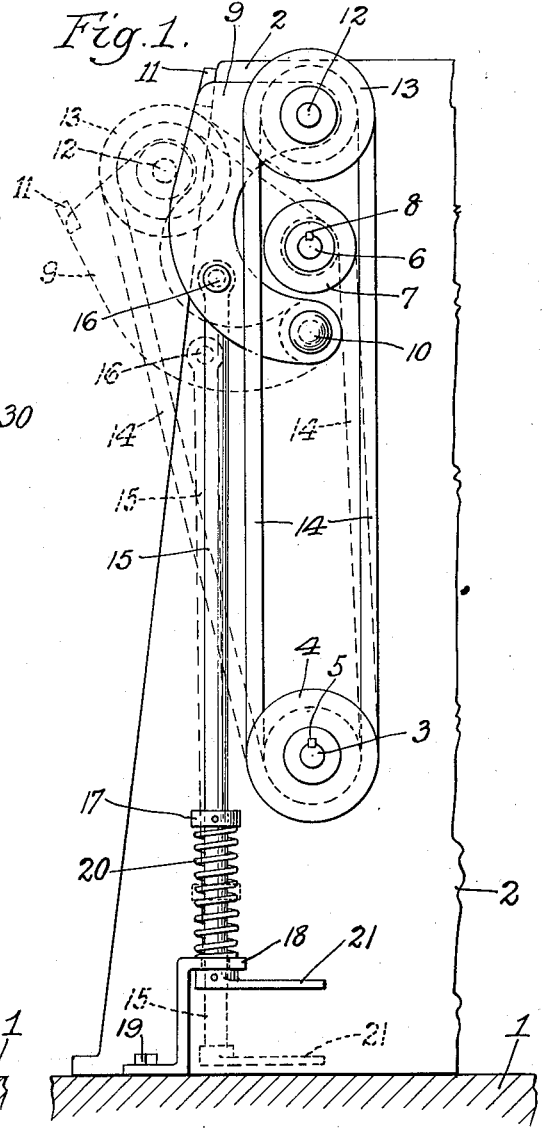
Inventor
Rupert B. Smart
by Parker + Carter
           Attorneys.

Patented Mar. 26, 1940

2,195,229

UNITED STATES PATENT OFFICE 2,195,229

TRANSMISSION

Rupert B. Smart, Chicago, Ill.

Application January 28, 1939, Serial No. 253,239

11 Claims. (Cl. 74—221)

This invention relates to a transmission controlling means and has for one object to provide a simple means of moving a driven element into and out of driving relationship with the member that is to drive it. Another object is to provide such a control primarily in connection with a friction belt. A still further object is to provide such a control in which the driving element and the driven element are carried in stationary bearings and in which a belt is moved toward and from the driven element. A still further object is to provide in connection with such a mechanism means for tightening the belt.

Other objects will appear from time to time throughout the specification and the claims.

The invention is illustrated more or less diagrammatically in the accompanying drawing, wherein:

Figure 1 is a side elevation of one form of the drive or transmission of the present invention;

Figure 2 is a side elevation of a modified form.

Like parts are designated by like characters throughout the specification and the drawing.

1 is a foundation which may be the floor of a building or any other suitable support. 2 indicates diagrammatically a frame or housing or support for a mechanism which is to be driven and for which the control of the present invention is intended. A driving shaft 3 is mounted in suitable bearings and carries a pulley 4, which may be keyed to the shaft as at 5. The details of the pulley and its support form no essential part of the invention. Many sorts of shaft, bearing and pulley arrangements might be used. The pulley might be carried or mounted directly upon a motor shaft.

6 is a shaft carried in suitable bearings and carrying a pulley 7 keyed to it as at 8. The member 6 may be part of the drive arranged to operate some mechanism, or it may merely be a shaft which it is desired to rotate.

In the form illustrated in Figure 1, an idler support 9 is pivoted as at 10 upon the member 2. It may carry a stop 11 and has mounted upon it a stub shaft 12, upon which a pulley 13 is journaled. A belt 14 is positioned about the driving pulley 4 and the idler pulley 13. It may be of the so-called V belt type; and if such a belt is used, the pulleys will obviously be arranged with suitable surfaces to engage the belt. The belt may or may not be elastic. One suitable type is a belt in which a plurality of laminations of fabric are enclosed or impregnated in rubber so that the belt is to some degree elastic.

While many different means may be provided for moving the idler support 9, one such means is shown in Figure 1. It comprises a rod 15 pivoted to the idler support as at 16. 17 is a collar fixed upon the rod 15. It passes through a loose perforation in a bracket 18, which is secured to the foundation 1 by means of a screw 19, or otherwise. The rod 15 fits loosely enough in the perforation to permit a certain amount of lateral swinging of the rod with respect to the bracket. 20 is a spring positioned about the rod 15 and bearing at one end upon the collar 17 and upon the other end upon the top of the bracket 18. 21 is a pedal mounted upon the lower end of the rod 15.

A modified form of the device shown in Figure 1 appears in Figure 2. The pulleys, the belt and the idler support are the same as above described. Instead of the rod 15, a rod 22 is used. It is pivoted at its upper end as at 23 upon the idler support, and at its lower end as at 25 upon a foot lever or pedal 25. This pedal is pivoted as at 26 upon an extension 27, which may be made integral with the member 2. A spring 28 is secured at one end upon the foot lever or pedal 25, and at its other end is secured as at 29 upon a pin or support upon the member 2.

In the form shown in Figure 2, a belt-tightening means is provided. It comprises a bell crank 30 pivoted as at 31 upon the member 2. At one end of one of the arms of the bell crank an idler roller 32 is journaled. The outer end of the other arm of the bell crank is connected by means of a link 33 to the idler carrier 9, and when the idler carrier is depressed to bring the belt 14 in engagement with the pulley 7, the tightening idler pulley 32 is moved in counter clock-wise direction and comes in contact with the belt 14 and exerts added tension upon it.

Although I have shown an operative form of my device, it will be understood that many changes in the form, shape and arrangement of parts might be made without departing from the spirit of my invention, and I wish that my showing be taken as in a sense diagrammatic.

The use and operation of this invention are as follows:

In the form shown in Figure 1, with the parts in full line position the driven pulley 7 is out of contact with the belt 14 and is stationary. When it is to be rotated, the pedal 21 is depressed, the rod 15 is moved to the dotted line position and carries with it the idler carrier 9 and the belt 14, both of which then assume the dotted line position. The belt 14 is, thus, brought into driving engagement with the pulley 7 and continues to drive the pulley as long as the parts are held in the dotted line position. When it is desired to stop the rotation of the pulley 7, the parts are restored to the full line position of Figure 1. If a slightly elastic belt is used, the elasticity of the belt may assist in this restoration.

The operation of the form of the device shown in Figure 2 is substantially the same as that described in connection with Figure 1. The operating rod and pedal mechanism are somewhat different, but they serve, in general, to move the idler carrier to a position in which the belt is brought into engagement with the driven pulley. The form of Figure 2 differs from that of Figure 1 somewhat; namely, by the inclusion of a belt-tightening means which operates simultaneously with the movement of the idler carrier. Thus, when the latter is moved to bring the belt in driving contact with the pulley 7, the pulley 32 is forced into contact with the belt and by putting pressure upon it increases its tension.

I claim:

1. In combination in a belt drive, a driving pulley, a driven pulley, said driven pulley mounted to rotate about a fixed axis, an idler and a belt, a movable carrier for the idler, means for holding the idler in an inactive position, the three pulleys being substantially in line during the inactive position, the driven pulley being normally out of contact with the belt when in the inactive position, means for moving the carrier and the idler to an active position, and for bringing the belt into contact with the driven pulley in that active position.

2. In combination in a belt drive, a driving pulley, a driven pulley, an idler and a belt, a movable carrier for the idler, means for holding the idler in an inactive position, the three pulleys being substantially in line during the inactive position, the driven pulley being normally out of contact with the belt when in the inactive position, means for moving the carrier and the idler to an active position, and for bringing the belt into contact with the driven pulley in that active position, and a belt-tensioning pulley and a movable support therefor, and means connecting said support to said carrier, movement of the carrier from the inactive to the active position serving to force the tensioning pulley against the belt.

3. In combination in a belt drive, a driving pulley, a driven pulley, said driven pulley mounted to rotate about a fixed axis, an idler and a belt, a movable carrier for the idler, means for holding the idler in an inactive position, the idler being further from the driving pulley than the driven pulley, the three pulleys being substantially in line during the inactive position, the driven pulley being normally out of contact with the belt when in the inactive position, means for moving the carrier and the idler to an active position and for bringing the belt into contact with the driven pulley in that active position.

4. In combination in a belt drive, a driving pulley, a driven pulley, an idler and a belt, a movable carrier for the idler, means for holding the idler in an inactive position, the idler being further from the driving pulley than the driven pulley, the three pulleys being substantially in line during the inactive position, the driven pulley being normally out of contact with the belt when in the inactive position, means for moving the carrier and the idler to an active position and for bringing the belt into contact with the driven pulley in that active position, and a belt-tensioning pulley and a movable support therefor, and means connecting said support to said carrier, movement of the carrier from the inactive to the active position serving to force the tensioning pulley against the belt.

5. In combination in a belt drive, a driving pulley, a driven pulley, an idler and a belt, a movable carrier for the idler, means for holding the idler in an inactive position, the idler being further from the driving pulley than the driven pulley, the three pulleys being substantially in line during the inactive position, the driven pulley being normally smaller than the driving pulley and out of contact with the belt when in the inactive position, means for moving the carrier and the idler to an active position and for bringing the belt into contact with the driven pulley in that active position, and a belt-tensioning pulley and a movable support therefor, and means connecting said support to said carrier, movement of the carrier from the inactive to the active position serving to force the tensioning pulley against the belt.

6. In combination in a driving control, a driving pulley, a fixed bearing therefor, a driven pulley and a fixed bearing therefor, said driven pulley mounted for rotation on its bearing and held against other movement, an idler carrier mounted for movement with respect to the two first mentioned pulleys and means for moving it, an idler pulley pivotally mounted on said carrier, a belt positioned about said driving pulley, about said driven pulley and about said idler pulley, said belt being out of contact with said driven pulley in one position of the idler carrier, the carrier mounted to be swung to bring the belt, by that movement alone, into contact with the driven pulley.

7. In combination in a driving control, a driving pulley, a fixed bearing therefor, a driven pulley and a fixed bearing therefor, said driven pulley mounted for rotation on its bearing and held against other movement, an idler carrier mounted for movement with respect to the two first mentioned pulleys and means for moving it, an idler pulley pivotally mounted on said carrier, an elastic belt positioned about said driving pulley and about said idler pulley, said belt being out of contact with said driven pulley in one position of the idler carrier, the carrier mounted to be swung to bring the belt, by that movement alone, into contact with the driven pulley.

8. In combination in a driving control, a driving pulley, a fixed bearing therefor, a driven pulley and a fixed bearing therefor, an idler carrier mounted for movement with respect to the two first mentioned pulleys and means for moving it and yielding means tending to hold it against movement, an idler pulley pivotally mounted on said carrier, an elastic belt positioned about said driving pulley and about said idler pulley, said belt being out of contact with said driven pulley in one position of the idler carrier, the carrier pivotally mounted to be swung to bring the belt into contact with the driven pulley.

9. In combination in a driving control, a driving pulley, a fixed bearing therefor, a driven pulley and a fixed bearing therefor, an idler carrier mounted for movement with respect to the two first mentioned pulleys and means for moving it, an idler pulley pivotally mounted on said carrier, a belt positioned about said driving pulley and about said idler pulley, said belt being out of contact with said driven pulley in one position of the idler carrier, the carrier adapted to be moved to bring the belt into contact with the driven pulley, and a belt-tensioning pulley and movable means for supporting it, said means being connected to said idler carrier, movement of the idler carrier to bring the belt into contact with the driven pulley being effective to move the belt-tightening pulley to compress the belt.

10. In combination in a driving control, a driving pulley, a fixed bearing therefor, a driven pulley and a fixed bearing therefor, an idler carrier mounted for movement with respect to the two first mentioned pulleys and means for moving it and yielding means tending to hold it against movement, an idler pulley pivotally mounted on said carrier, a belt positioned about said driving pulley and about said idler pulley, said belt being out of contact with said driven pulley in one position of the idler carrier, the carrier adapted to be moved to bring the belt into contact with the driven pulley, and a belt-tensioning pulley and movable means for supporting it, said means being connected to said idler carrier, movement of the idler carrier to bring the belt into contact with the driven pulley being effective to move the belt-tightening pulley to compress the belt.

11. In combination in a driving control, a driving pulley, a fixed bearing therefor, a driven pulley and a fixed bearing therefor, an idler carrier mounted for movement with respect to the two first mentioned pulleys and means for moving it and yielding means tending to hold it against movement, an idler pulley pivotally mounted on said carrier, a flexible belt positioned about said driving pulley and about said idler pulley, said belt being out of contact with said driven pulley in one position of the idler carrier, the carrier adapted to be moved to bring the belt into contact with the driven pulley, and a belt-tensioning pulley and movable means for supporting it, said means being connected to said idler carrier, movement of the idler carrier to bring the belt into contact with the driven pulley being effective to move the belt-tightening pulley to compress the belt.

RUPERT B. SMART.